(12) United States Patent
Andrejak et al.

(10) Patent No.: US 7,737,647 B2
(45) Date of Patent: Jun. 15, 2010

(54) RECTIFIER AND SYSTEM FOR CONTROLLING THE SPEED OF AN ELECTRIC MOTOR

(75) Inventors: Jean-Marie Andrejak, Saint Yrieix (FR); Christian Andrieux, Angouleme (FR); Mathias Tientcheu-Yamdeu, Angouleme (FR); Alexandre Lagarde, Montemboeuf (FR)

(73) Assignee: Moteurs Leroy-Somer, Angouleme (FR)

( * ) Notice: Subject to any disclaimer, the term of this patent is extended or adjusted under 35 U.S.C. 154(b) by 467 days.

(21) Appl. No.: 11/631,302

(22) PCT Filed: Jul. 5, 2005

(86) PCT No.: PCT/FR2005/050541

§ 371 (c)(1),
(2), (4) Date: Feb. 28, 2007

(87) PCT Pub. No.: WO2006/005885

PCT Pub. Date: Jan. 19, 2006

(65) Prior Publication Data

US 2007/0296363 A1 Dec. 27, 2007

(30) Foreign Application Priority Data

Jul. 5, 2004 (FR) .................................. 04 51443
Jan. 26, 2005 (FR) .................................. 05 50226

(51) Int. Cl.
*H02P 3/18* (2006.01)
(52) U.S. Cl. ........................ 318/376; 318/370; 318/430; 318/254; 318/293

(58) Field of Classification Search ................. 318/254, 318/430, 439, 376, 370, 801, 400.11, 400.21, 318/293; 363/95, 98, 132
See application file for complete search history.

(56) References Cited

U.S. PATENT DOCUMENTS

| 4,272,807 A | 6/1981 | Gallagher |
| 4,447,868 A | 5/1984 | Turnbull |
| 4,678,063 A | 7/1987 | Kitaoka et al. |

(Continued)

FOREIGN PATENT DOCUMENTS

CN          1033297 C    11/1996

(Continued)

OTHER PUBLICATIONS

N. Roux et al., "Self-Switching Converters: Application to the Design of a Naturally Reversible Rectifier", EPE 2003, Toulouse, pp. 1-10.

*Primary Examiner*—Paul Ip
(74) *Attorney, Agent, or Firm*—Oliff & Berridge, PLC (57) ABSTRACT

The invention concerns a reversible current rectifier, for connection to part of a polyphase network and to a continuous bus comprising a plurality of rectifier cells each rectifier cell including a rectifying device and a on-way electronic switch connected in anti-parallel with the rectifier device, the rectifying devices of different cells being arranged so as to form one rectifier. Each rectifier cell comprises means for controlling the electronic switch of the cell arranged to control the latter in closure after detecting a conduction of the rectifying device of the cell so as to enable current to be returned to the network. The control means are arranged to receive a signal external to the cell, for controlling the opening of the electronic switch, derived from another rectifier cell.

36 Claims, 8 Drawing Sheets

U.S. PATENT DOCUMENTS

| | | | |
|---|---|---|---|
| 4,788,485 A * | 11/1988 | Kawagishi et al. | 318/811 |
| 4,914,371 A * | 4/1990 | Shibata et al. | 318/723 |
| 4,935,684 A | 6/1990 | Watanabe | |
| 4,953,070 A | 8/1990 | Lenz | |
| 5,070,290 A | 12/1991 | Iwasa et al. | |
| 5,146,148 A * | 9/1992 | Voet | 318/803 |
| 5,376,867 A * | 12/1994 | Capetti | 318/376 |
| 5,576,606 A * | 11/1996 | Nguyen Phuoc et al. | 318/801 |
| 5,629,603 A * | 5/1997 | Kinoshita | 180/65.8 |
| 5,642,270 A * | 6/1997 | Green et al. | 363/17 |
| 5,847,533 A * | 12/1998 | Hakala et al. | 318/798 |
| 5,883,484 A * | 3/1999 | Akao | 318/700 |
| 5,900,683 A * | 5/1999 | Rinehart et al. | 307/129 |
| 5,914,582 A | 6/1999 | Takamoto et al. | |
| 6,104,149 A * | 8/2000 | Pelly | 318/400.21 |
| 6,211,635 B1 * | 4/2001 | Kambe et al. | 318/400.11 |
| 6,236,172 B1 * | 5/2001 | Obara et al. | |
| 6,445,879 B1 | 9/2002 | Youn et al. | |
| 6,580,627 B2 * | 6/2003 | Toshio | 363/98 |
| 6,724,313 B2 * | 4/2004 | Sato et al. | 340/590 |
| 6,759,964 B2 * | 7/2004 | Sato et al. | 340/590 |
| 6,798,157 B2 * | 9/2004 | Takahashi et al. | 318/400.21 |
| 7,034,475 B2 * | 4/2006 | Kato et al. | |
| 7,088,065 B2 * | 8/2006 | Ishikawa et al. | |
| 7,176,653 B2 * | 2/2007 | Jahkonen | 318/807 |
| 7,265,455 B2 * | 9/2007 | Oyobe et al. | 290/1 R |
| 7,268,521 B1 * | 9/2007 | Prakash et al. | 320/166 |
| 7,339,803 B2 * | 3/2008 | Nojima | 363/37 |
| 7,352,083 B2 * | 4/2008 | Nielsen et al. | 307/66 |
| 7,436,686 B2 * | 10/2008 | Mavier et al. | 363/95 |
| 2003/0048086 A1 * | 3/2003 | Takahashi et al. | 318/430 |
| 2003/0057927 A1 * | 3/2003 | Donat | 323/201 |
| 2003/0107344 A1 * | 6/2003 | Saeki | 318/801 |
| 2003/0118876 A1 * | 6/2003 | Sugiura et al. | 429/9 |
| 2003/0146726 A1 * | 8/2003 | Ishikawa et al. | 318/442 |
| 2004/0113572 A1 * | 6/2004 | Iwaji et al. | 318/254 |
| 2005/0128671 A1 * | 6/2005 | Miyamoto | 361/118 |
| 2005/0258795 A1 * | 11/2005 | Choi | 318/625 |
| 2007/0064363 A1 * | 3/2007 | Nielsen et al. | 361/90 |
| 2007/0086226 A1 * | 4/2007 | Mavier et al. | 363/132 |
| 2007/0194734 A1 * | 8/2007 | Weinmann et al. | 318/439 |
| 2007/0296363 A1 * | 12/2007 | Andrejak et al. | 318/504 |
| 2009/0051346 A1 * | 2/2009 | Manabe et al. | 323/363 |

FOREIGN PATENT DOCUMENTS

| | | |
|---|---|---|
| DE | 199 13 634 A1 | 9/2000 |
| WO | WO 03/067745 A2 | 8/2003 |

* cited by examiner

FIG.1

STATE OF THE ART

RECTIFIER AND SYSTEM FOR CONTROLLING THE SPEED OF AN ELECTRIC MOTOR

The present invention relates in particular to systems for controlling the speed of an electric motor, for example a traction or lifting electric motor.

Systems for controlling the speed of three-phase asynchronous or synchronous electric motors which include a rectifier connected to the network and to a DC bus are known. The rectifier comprises a filtering stage and supplies a power stage, which is controlled by a control unit. The filtering stage comprises a number of capacitors for an overall capacitance that is relatively high, for example of the order of 2200 µF for a power of 22 kW. The system can also comprise a device for precharging the capacitors of the filtering stage, a chopper and a resistor to dissipate the energy restored by the electric motor on braking.

The filtering stage makes it possible to reduce the risk of instability of the motor and absorb the overvoltages when energy is returned from the motor to the control system.

The capacitors used in the filtering stage present the drawback of having, compared to the other components, a relatively short life, particularly at high temperature, and they are also relatively costly and bulky components.

According to one of its aspects, one of several, the invention aims to remedy the drawbacks associated with the use of these capacitors of relatively high capacitance and an inductance in the filtering stage, in particular in order to increase the reliability and reduce the cost and footprint of the control systems.

The present invention also relates, according to another of its aspects, to a reversible current rectifier to be connected to a polyphase network, in particular a three-phase network, and to a DC bus.

Such a rectifier can be used, for example, in variable speed drives where the DC bus supplies an inverter connected to a motor of a pulling, lifting or conveying system, in particular.

U.S. Pat. Nos. 4,447,868 and 4,272,807 describe reversible rectifiers comprising rectifier cells comprising a diode and a transistor connected in antiparallel.

In these patents, the transistor controls are based on voltage measurements on the phases of the network, which makes the rectifiers relatively complex and susceptible to disturbances on the network.

Consequently, in light of these previous patents, there is a need for a reversible rectifier that is reliable and simple to construct.

International patent WO 03/067745 describes a solid state electric energy converter.

Figure 6:
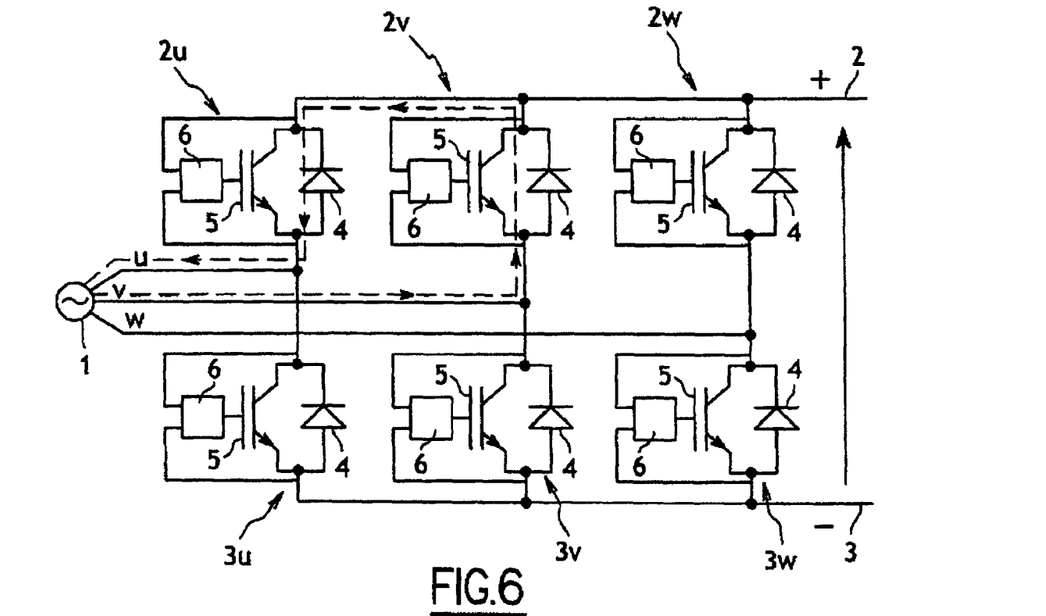
FIG. 6, described previously, represents a state of the art concerning the reversible rectifier.

The publication *Self-Switching Converters: Application to the Design of a Naturally Reversible Rectifier EPE* 2003 *Toulouse*, the content of which is incorporated in this for reference, describes a full-wave reversible rectifier as illustrated in FIG. 6.

Such a rectifier can be connected to a three-phase AC network 1 comprising three phases U, V and W, and to a DC bus comprising two lines 2, 3 of positive and negative polarities, respectively.

The rectifier comprises six rectifier cells, namely three cells $2_u$, $2_v$ and $2_w$ respectively associated with each of the phases U, V and W, and with the positive polarity line 2 of the DC bus and three other rectifier cells $3_u$, $3_v$ and $3_w$, respectively associated with the phases U, V and W and with the negative polarity line 3 of the DC bus.

Each rectifier cell comprises a diode 4 connected in antiparallel with an IGBT 5, which is opened and closed by control means 6 arranged to react to the voltage at the terminals of the cell, close the IGBT when the diode 4 starts to conduct and open the IGBT when the current passing through the latter exceeds a predefined limit. The IGBT which is closed makes it possible to return current to the network, if appropriate.

In such a rectifier, at the moment when the diode of one of the rectifier cells associated with one of the polarities of the DC bus begins to conduct, the electronic switch of another rectifier cell associated with this same DC bus polarity is still passing, which creates, in each period of the network, a short-circuit loop, as illustrated by a broken line in FIG. 6. This short circuit generates a current pulse on the network with harmonics that constitute a source of electromagnetic interference.

An expensive electromagnetic compatibility filter is then needed.

The invention also aims to remedy the drawbacks of such a reversible rectifier.

Control System

According to one of its aspects, the subject of the invention is a system for controlling the speed of an electric motor, comprising:
 a converter to be connected to a polyphase electricity network and to a DC bus,
 a filtering stage for the DC bus comprising at least one capacitor,
 a power stage to be connected to the electric motor,
 a control unit for the power stage, the converter being reversible and arranged to return to the network at least a fraction of the energy likely to be restored by the electric motor in operation, the filtering stage preferably having an insufficient capacitance to stabilize the operation of the motor, in particular to absorb all this energy.

The filtering stage can comprise only one or several capacitors of relatively low capacitance, compared to the values encountered in the filtering stages of the known control systems.

The filtering stage can in particular be reduced to one or more high frequency filtering capacitors, the or each capacitor possibly being incorporated in the rectifier and/or in the power stage.

The absence of filtering stage with high-capacitance capacitors makes it possible to reduce the cost and the footprint of the control system and increases the reliability.

The invention can also make it possible, despite a low farad value of the capacitors, not to limit the output frequency of the current powering the motor, for example to reach a value greater than 300 Hz, in order to power motors having a relatively large number of poles, for example motors with 10, 12 or 32 poles.

The invention can also make it possible to improve the control dynamic range of the motor, in order, for example, to be able to slow down more rapidly.

The total capacitance of the capacitor or capacitors of the filtering stage is, for example, less than or equal to 5 µF per kW, for example less than or equal to 300 µF for a power of more than 160 kW, the total capacitance value depending on the power. The power is, for example, greater than or equal to 20 kW, even 100 kW.

In an exemplary embodiment of the invention, the control system has no chopper and no braking resistor. This makes it possible to reduce still further the footprint and cost of the control system. On braking, energy can be restored to the network rather than dissipated into a resistor.

The control system can also not have a circuit to assist in the charging of the capacitor or capacitors of the filtering stage. In the case of very high power motors, the invention can also make it possible to limit the inrush currents.

In an exemplary embodiment of the invention, the control unit of the power stage and the power stage are configured to power an asynchronous or synchronous motor, particularly a three-phase motor.

The invention is advantageously applicable to the control systems in which the power stage is configured to drive a motor with a power greater than or equal to one kilowatt, even several kilowatts (for example 7.5 kw and above) because of the greater instability of the high-power motors.

In an exemplary embodiment of the invention, the converter comprises self-switched switching cells.

The use of such switching cells is particularly advantageous since it facilitates the production of a converter having a relatively short response time and operating independently. This can, furthermore, make it possible to modify existing control systems with conventional filtering stage and rectifier, by replacing the conventional rectifier with a converter and the conventional filtering stage with a filtering stage with less filtering capacitance.

Reversible Rectifier

Another subject of the invention, according to another of its aspects, independently or in combination with the above, is a reversible current rectifier, to be connected to a polyphase network and to a DC bus, comprising:

a plurality of rectifier cells, each rectifier cell comprising a rectifier device and a one-way electronic switch connected in anti-parallel with the rectifier device, the rectifier devices of the various cells preferably being arranged so as to form one full-wave rectifier, each rectifier cell comprising means of controlling the electronic switch of the cell arranged to close the latter after detecting a conduction of the rectifier device of the cell, so as to enable current to be returned to the network, rectifier in which the control means are arranged to receive a signal external to the cell, controlling the opening of the electronic switch, from another rectifier cell.

The rectifier devices can advantageously be spontaneous-switching rectifier devices such as diodes and the electronic switches of the IGBTs.

The electronic switch of a rectifier cell can be opened when the electronic switch of another rectifier cell is closed, which makes it possible to reduce the abovementioned short-circuit current, by adjusting it roughly to the level of this current in a conventional diode bridge. Thus, the performance characteristics of the rectifier in terms of electromagnetic compatibility are enhanced, without it being necessary to provide a costly electromagnetic compatibility filter.

Furthermore, the invention can make it possible to produce a rectifier that is relatively reliable and insensitive to interference from the network.

In an exemplary embodiment of the invention, each rectifier cell is arranged to generate, on closure of the electronic switch of that cell, at least one signal controlling the opening of the electronic switch of another rectifier cell associated with the same DC bus polarity.

Preferably, each rectifier cell receives signals controlling the opening of its electronic switch from other cells associated with the same DC bus polarity. This makes it possible to connect the rectifier to the three-phase network without previously marking the phases.

Each rectifier cell can advantageously comprise an independent electric power supply, for example a power supply arranged to deliver a first voltage that is negative relative to the reference used to control the electronic switches, and a second voltage that is positive relative to this reference. Other voltages can be generated, according to the nature of the electronic switches to be controlled. Thus, for certain components, for example, a negative voltage may not be needed. A negative voltage can be used to provide a reliable blocking of the electronic switch when the latter is opened, in the case in particular where this electronic switch is an IGBT.

The abovementioned control means can be analog, which can increase the reliability and reduce the cost of the rectifier.

The control means can be arranged to provoke the opening of an electronic switch in the event of an overcurrent in the latter, that is, when the intensity of the current passing through it exceeds a predefined trip current. This thus offers an additional protection. The overcurrent can be detected by measuring the voltage at the terminals of the electronic switch when the latter is passing.

The rectifier cells can be roughly identical.

The control means are preferably arranged to inhibit the closure of the electronic switch following an abrupt variation of the voltage at the terminals of the rectifier device generated on the opening of the electronic switch of the other cell of the same arm, that is, connected to the same phase of the network but to the opposite DC bus polarity. To this end, the control means can include inhibition means such as, for example, a filter with saturation of the signal differential. As a variant, the control means can include angular phase detection means arranged to inhibit the closure of the electronic switch within a certain range of angular phase values during which the opening of the electronic switch of the other rectifier cell of the same arm takes place.

Another subject of the invention, according to another of its aspects, is a rectifier cell comprising:

a rectifier device, a one-way electronic switch connected in anti-parallel with the rectifier device, control means arranged to:

control the closure of the electronic switch when the rectifier device becomes passing, when the electronic switch is closed, deliver to at least one other cell, a signal controlling the opening of the electronic switch of that other cell, and receive from at least one other cell a signal controlling the opening of the electronic switch and open that electronic switch on receipt of this signal.

Such a rectifier cell can be offered to the user, where appropriate, in the form of a single component provided with connections or already assembled with other rectifier cells within a reversible rectifier or a more complex system.

When the rectifier cell takes the form of a single component or module, the latter comprises, for example, an input to be connected to a phase of the network, an output to be connected to a polarity of the DC bus, at least one input to receive the open control signal from another cell and at least one output to send an open control signal to another cell.

The cell preferably comprises an independent electric power supply.

The cell can also comprise a filter with saturation of the signal differential, which makes it possible to avoid an unwanted control of the electronic switch on voltage variations induced by the other rectifier cells.

The cell can comprise at least one operational amplifier, one input of which is adjusted to different potentials throughout the operating cycle of the cell, in particular to three different potentials, respectively corresponding to a blocking of the electronic switch, to a protection in case of overcurrent and to a detection of conduction of the rectifier device.

Another subject of the invention is a system for controlling the speed of an electric motor comprising a reversible rectifier as defined above.

Another subject of the invention is a system for controlling a generator, for example a wind generator, comprising a reversible rectifier as defined above.

Another subject of the invention is an energy recovery system comprising a reversible rectifier as defined above and a quasi current source, in particular solar panels.

The rectifier can be used to supply the rectified network voltage.

Control System Equipped with Such a Reversible Rectifier

Another subject of the invention is a system for controlling the speed of an electric motor, comprising:
  a reversible rectifier to be connected to a polyphase electricity network and connected to a DC bus,
  this rectifier comprising a plurality of rectifier cells, each rectifier cell comprising a rectifier device and a one-way electronic switch, connected in anti-parallel with the rectifier device, the rectifier devices of the various cells being arranged so as to form a rectifier, each rectifier cell comprising means of controlling the electronic switch of the cell arranged to close the latter after detecting a conduction of the rectifier device of the cell so as to enable current to be returned to the network, the control means being arranged to receive a signal external to the cell, controlling the opening of the electronic switch, from another rectifier cell,
  a power stage connected to the DC bus and to be connected to the electric motor.

The control system can comprise a filtering stage for the DC bus, comprising at least one capacitor, the capacitance of the or each capacitor or capacitors of the filtering stage being less than or equal to 5 μF per kW of power supplied.

The control means are advantageously arranged to inhibit the closure of the electronic switch following an abrupt variation of the voltage at the terminals of the rectifier device, generated on the opening of the electronic switch of the cell connected to the same phase of the network and to the opposite DC bus polarity.

The control means are advantageously arranged to inhibit, for a given rectifier cell, the closure of the electronic switch in a predefined angular range, on the one hand between $60°+\Delta\phi_1$ and $300°-\Delta\phi_2$ and mandatorily including on the other hand the range $120°-\Delta\phi_3$ and $240°+\Delta\phi_4$, with $\Delta\phi_1>0$, $\Delta\phi_2>0$, $\Delta\phi hd 3>0$ and $\phi_4>t_e$, where $t_e$ is the encroachment time, the angular reference being taken at the summit of the arch during which the rectifier device of the rectifier cell concerned is passing.

The invention will be better understood from reading the detailed description that follows, of non-limiting exemplary embodiments of the latter, and by examining the appended drawing, in which.

CONTROL SYSTEM

Figure 1:
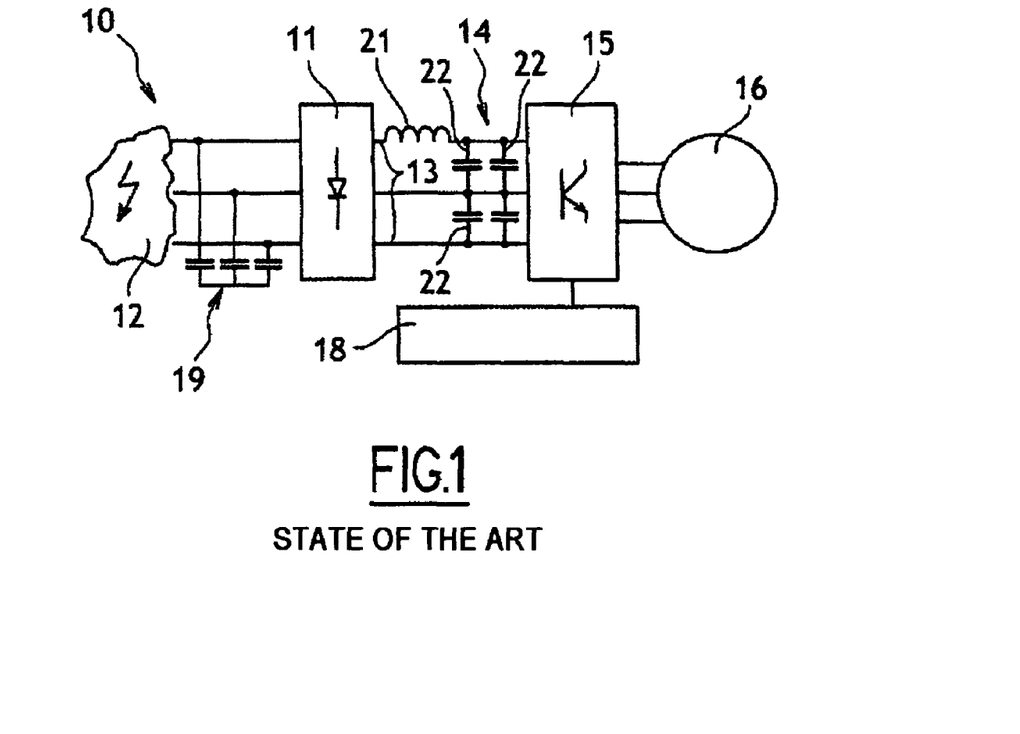
FIG. 1 illustrates the state of the art.

A control system 10 produced according to the prior art is represented diagrammatically in FIG. 1.

This control system 10 comprises a non-reversible rectifier 11 with diode bridge, connected to the three-phase electricity network (12), for example the 400 Volt 50 Hertz three-phase network, and to a DC bus 13.

This DC bus 13 powers, via a filtering stage, a power stage 15, for example with IGBT, to which a three-phase electric motor 16 is connected, the power stage 15 being controlled by a control unit 18.

A filter 19 providing electromagnetic compatibility is connected to the network 12 upstream of the rectifier 11, as illustrated.

A filtering stage 14 is connected to the DC bus. This filtering stage 14 comprises an inductance 21 in series on one of the lines of the DC bus and a plurality of capacitors 22 equivalent to a single capacitor.

The value of the overall capacitance seen between the + and the − polarities of the DC bus 13 depends on the electrical power of the motor 16, being for example, typically of the order of 390 μF for a power of 2.2 kw, 1100 μF for a power of 11 kW, 2200 μF for a power of 22 kW, 4400 μF for a power of 60 kW and 13 200 μF for a power of 160 kW.

The control unit 18 is, for example, arranged to control the speed of the motor 16, for example according to different known control laws: a U/f law, a control in open loop mode (without return) or in closed loop mode (with a return) where U denotes the voltage between phases at the terminals of the motor 16 and f the frequency of the current in one of the phases.

Figure 2:
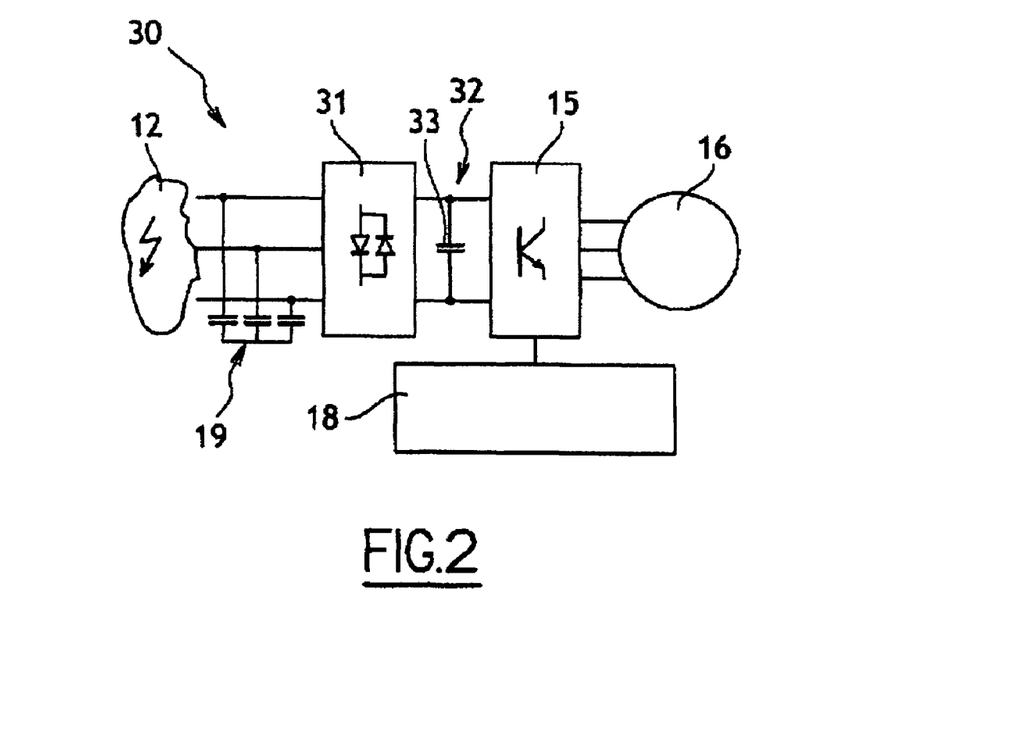
FIG. 2 represents a control system implemented according to the invention.

FIG. 2 shows an exemplary control system 30 produced according to the invention.

This control system 30 can comprise a power stage 15 with IGBT or any other power electronic component suitable for controlling a motor, controlled by an appropriate control unit 18, like the known control systems such as, for example, the one described with reference to FIG. 1.

The control system 30 differs from the control system 10 described previously by the fact that the rectifier 11 with diode bridge is replaced by a converter 31 connected to the network without the intermediary of a polyphase inductance, by the fact that the filtering stage 14 is replaced by a filtering stage 32 not including the inductance 21 and with an overall filtering capacitance that can be significantly lower. The converter 31 can even be called "reversible rectifier", and comprise, for example, a rectifier as described below.

Figure 3:
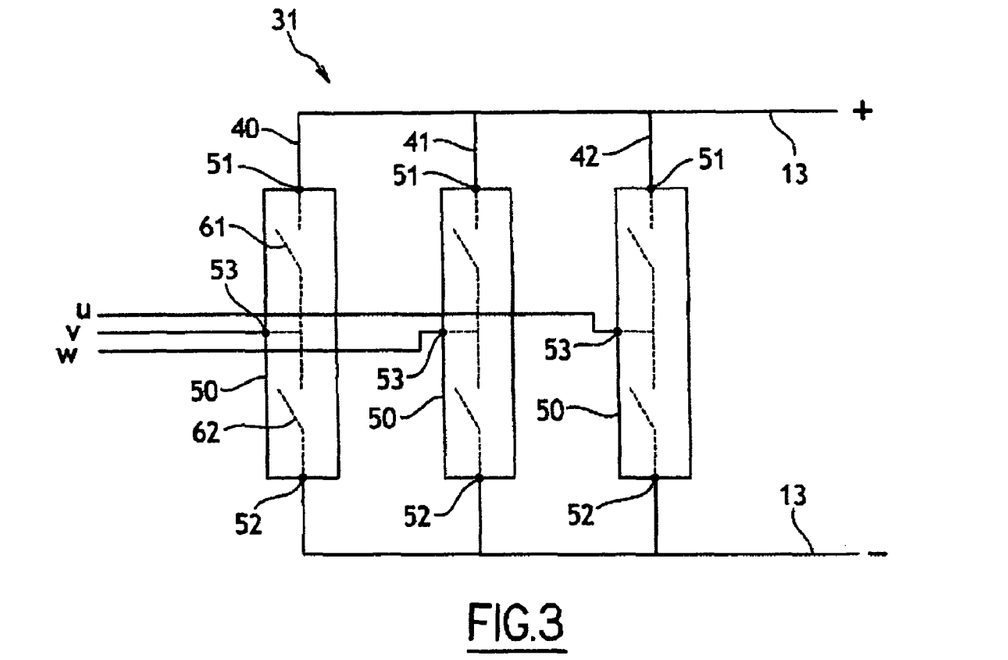
FIG. 3 represents an exemplary standalone converter.

Referring to FIG. 3, it can be seen that the rectifier 31 comprises three arms 40, 41 and 42 respectively associated with the three phases u, v and w of the network 12.

On each arm 40, 41 or 42 can be mounted a switching unit 50 comprising two terminals 51 and 52 respectively connected to the + and − polarities of the DC bus 13 and an input 53 connected to the associated phase u, v or w.

Each switching unit 50 can comprise two switching cells 61 and 62 making it possible to make or break the passage of the current between the terminals 51 and 53 for the cell 61 and between the terminals 52 and 53 for the cell 62.

Figure 4:
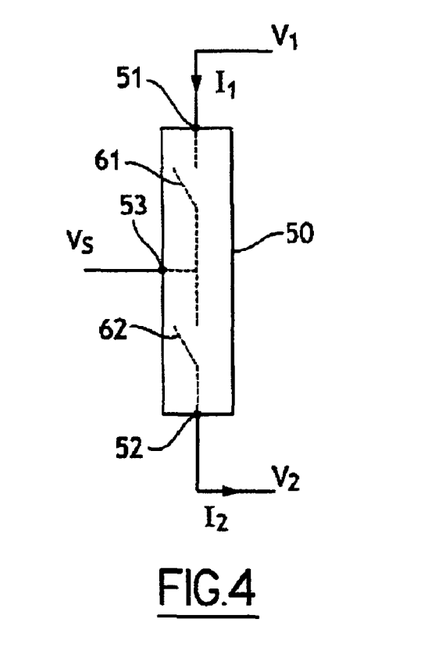
FIGS. 4 and 5 represent implementation details of the converter.

Advantageously, each switching unit 50 operates independently, the switching cells 61 and 62 being controlled so as to obtain the following operation, with reference to FIG. 4.

The switching cell 61 is self-fired when the voltage passes through zero in the direction $V_s$ greater than $V_1$ (negative current $I_1$). The switching cell 61 is blocked immediately the current is positive and becomes greater than an intensity of given threshold, corresponding to a trip current.

The switching cell 62 is self-fired when the voltage passes through zero in the direction $V_2$ greater than $V_s$ (negative current $I_2$). The switching cell 62 is blocked immediately the current is positive and becomes greater than an intensity of predefined threshold, corresponding to a trip current.

The switching cells 61, 62 can, for example, each comprise a diode 64 such that the energy transfer from the network 12 to the filtering stage 32 is handled by a diode bridge. In the other direction, that is, from the filtering stage to the network, the energy transfer can be handled by power transistors 65, each connected in parallel with a diode 64, for example one or several IGBTs, controlled switching-wise by an appropriate electronic circuit 66 so as to obtain the abovementioned operating law.

When the reversible rectifier is not implemented as described below, the switching unit 50 can, for example, be implemented in accordance with the teachings of the international patent application WO 03/067745. Reference can also usefully be made to the article "*Self-Switching Converters: Application to the Design of a Naturally Reversible Rectifier*", published in EPE 2003—Toulouse, ISB 90-75815-07-7.

The control system that has just been described makes it possible to avoid the control instabilities of the motor despite the low capacitance of the capacitor or capacitors of the filtering stage 32.

The energy returned by the motor 16 to the network 12 also makes it possible, where appropriate, to eliminate the chopper and the resistor normally used to dissipate this energy.

The advantages of the control system can also be exploited to increase only the output frequency of the current towards the motor 16, retaining a filtering capacitance that is far lower than that of the prior art, as mentioned above.

Reversible Rectifier

Figure 7:
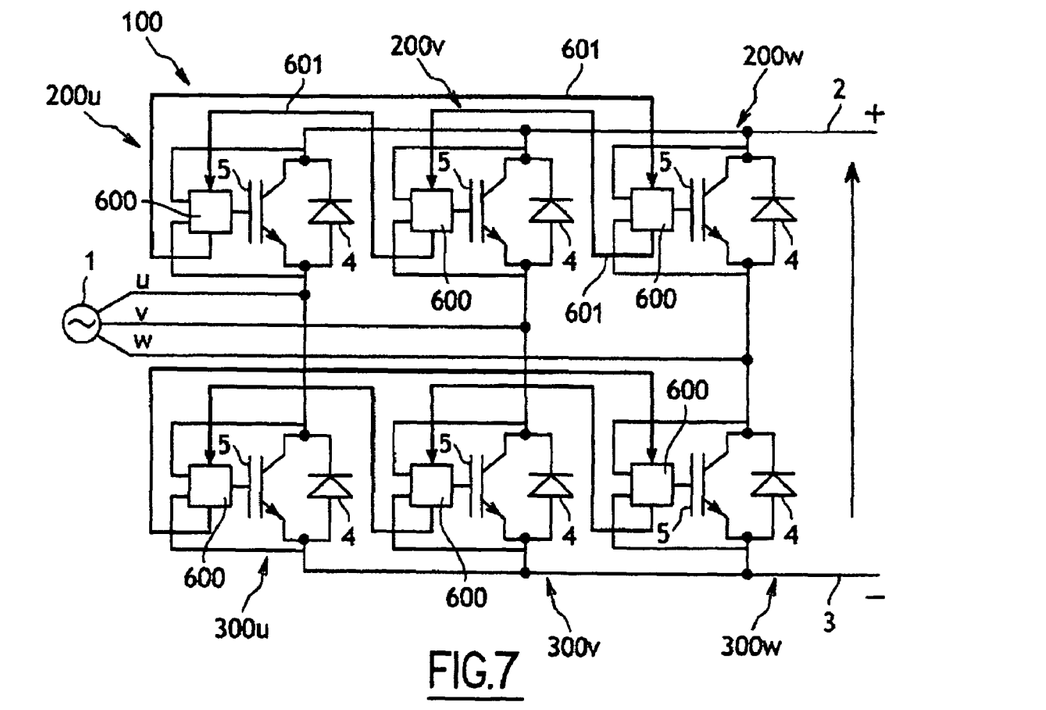
FIG. 7 is a view similar to FIG. 6 of an exemplary embodiment of the invention.

FIG. 7 shows a reversible rectifier 100 implemented in accordance with the invention, comprising rectifier cells $200_u$, $200_v$ and $200_w$ respectively connected on the one hand to each of the phases U, V and W of a three-phase network 1 and on the other hand to the positive polarity line 2 of a DC bus and rectifier cells $300_u$, $300_v$ and $300_w$ respectively connected on the one hand to the phases U, V and W and on the other hand to the negative polarity line 3 of the DC bus.

The rectifier cells each comprise a rectifier device consisting, in the example under construction, of a power diode 4, connected in anti-parallel with a one-way electronic switch 5 comprising an IGBT.

Each electronic switch 5 is driven by control means 600.

These control means 600 are arranged to detect the firing of the diode 4 and then control the closure of the associated electronic switch 5.

According to the invention, the control means 600 are also arranged to deliver an open control signal 601 to another rectifier cell, associated with the same DC bus polarity and with which it is likely to experience a short-circuit problem in the event of simultaneous conduction of the electronic switches of these two cells. The reception of this control signal 601 by the control means 600 of a rectifier cell causes the electronic switch of that cell to be opened.

In the example of FIG. 2, the cell $200_u$ sends the control signal 601 to the cell $200_w$, the latter sends the control signal 601 to the cell $200_v$ which sends the control signal 601 to the cell $200_u$, the device of FIG. 2 being designed to operate with a predefined order of the phases U, V and W.

Figure 8:
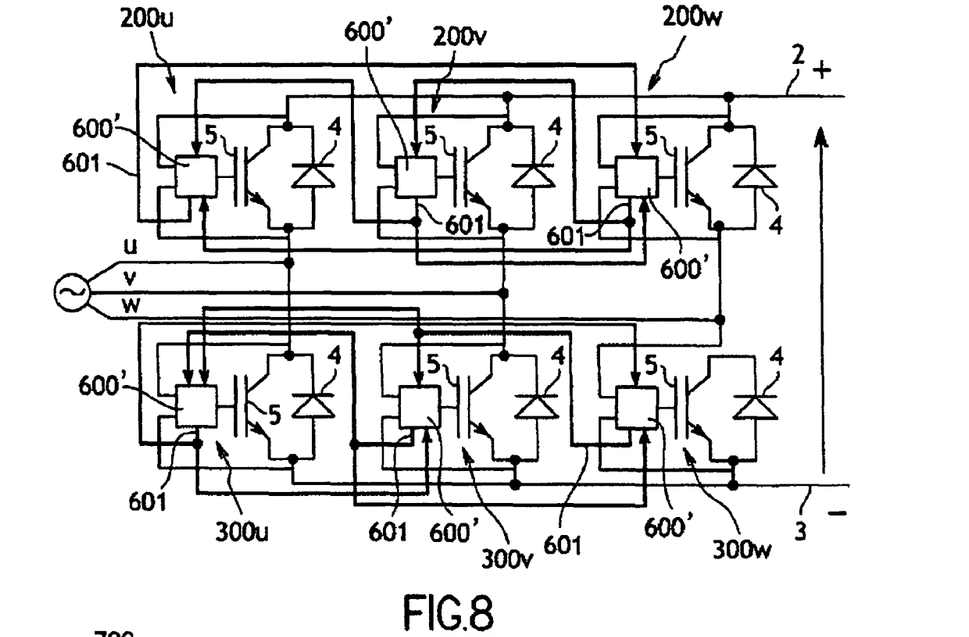
FIG. 8 is a view similar to FIG. 7 of another exemplary embodiment of the invention, FIG. 9 diagrammatically represents a standalone power supply to supply the control means of a rectifier cell.
Figure 9:
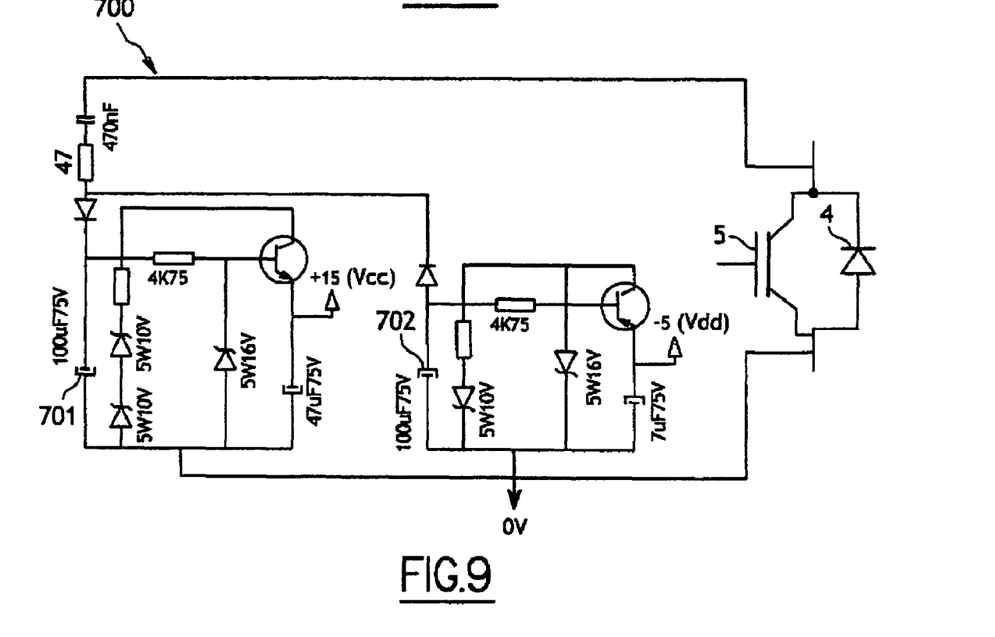

The variant of embodiment in FIG. 8 makes it possible to operate with any input phase order.

In this variant, the control means 600 of FIG. 7 are replaced by control means 600' arranged to send the control signal 601 to the other two rectifier cells associated with the same DC bus polarity.

In both cases, the control means 600 or 600' are arranged to receive the or each control signal 61 originating from the or each other cell associated with the same DC bus polarity.

In the example under consideration, the control signal 601 is emitted by a rectifier cell simultaneously with the command to close the electronic switch 5 of that cell, in response to the firing of the diode 4 of that cell.

This makes it possible to reduce the amplitude of the short-circuit current pulses within a loop formed between the two corresponding phases by the two rectifier cells associated with the same DC bus polarity and connected to said phases.

Each rectifier cell of the examples of FIG. 7 or 8 comprises a standalone power supply 700 represented in FIG. 4, connected to the cathode and to the anode of the diode 4 and delivering two reference voltages −5V and +15V relative to a 0V voltage corresponding to the potential of the anode of the diode 4. This power supply comprises capacitors 701 and 702 having a capacitance that is sufficient to generate the voltage required during a period of the network, and an associated electronic circuit making it possible to supply the required voltages.

Figure 10:
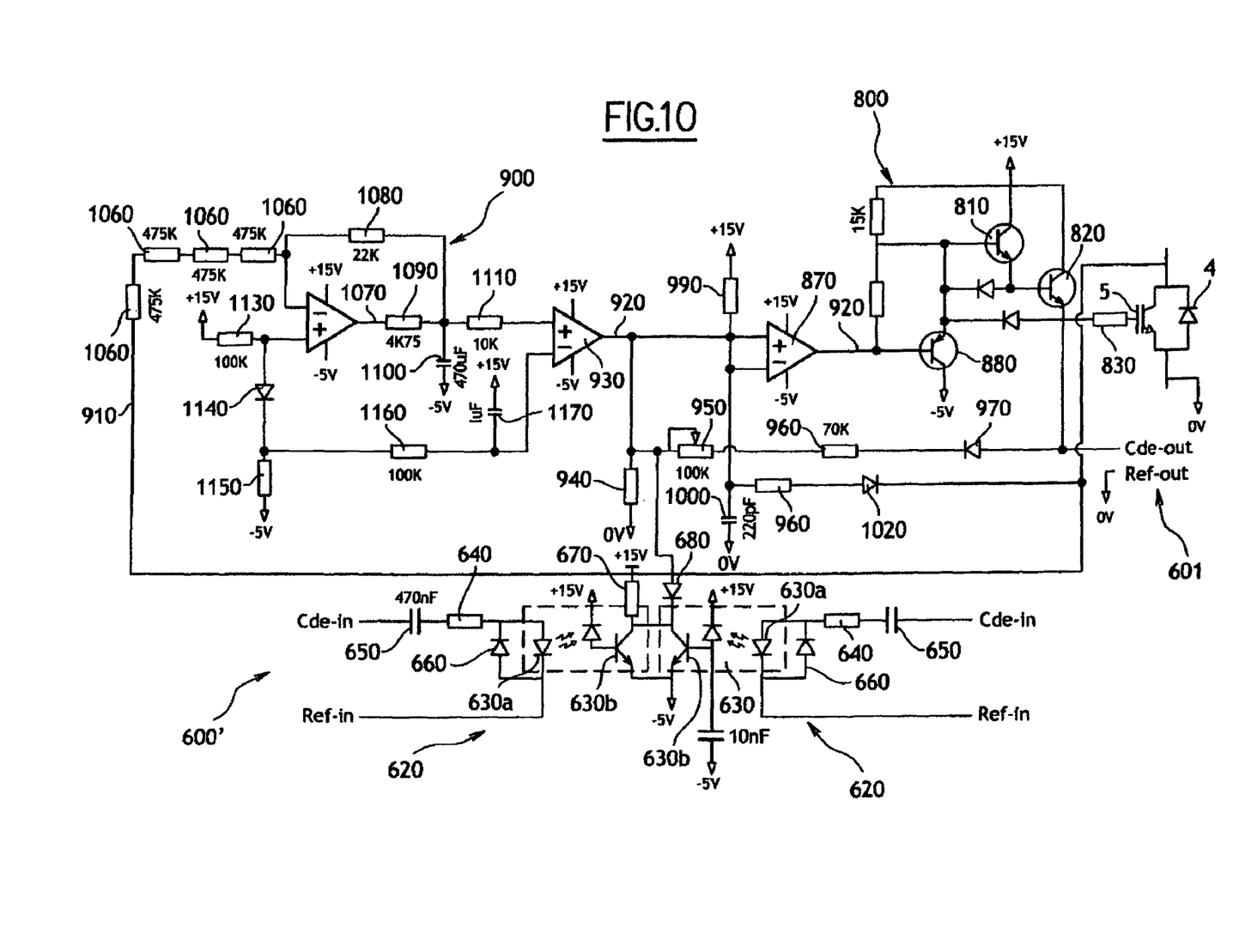
FIG. 10 represents an exemplary implementation of control means of a rectifier cell, FIGS. 11 and 12 diagrammatically represent other exemplary implementations of control means of electronic switches.

FIG. 10 shows the control means 600' of a rectifier cell implemented in accordance with an exemplary embodiment of the invention.

The control means 600' comprise two stages 620 for receiving control signals 601 originating from the other cells, each signal 601 being carried by two lines, a line Ref_in at the 0V potential of the cell from which this signal originates and a line Cde_in which is adjusted to a positive potential (approximately +15V) relative to the line Ref_in when the control signal 601 is generated.

Each stage 620 includes an optocoupler 630, the light-emitting diode 630a of which is powered by the line Cde_in via a resistor 640 connected in series with a capacitor 650.

A diode 660 is connected in antiparallel with the diode 630a.

The phototransistor 630b of the optocoupler has its emitter at the −5V of the independent power supply 700 described previously and its collector linked via a resistor 670 to the +15V and to the cathode of an output diode 680.

The control means 600 differ from the control means 600' by the presence of a single stage 620 instead of two.

The control means 600 or 600' comprise a power stage 800 controlling the electronic switch 5.

This power stage 800 comprises, in the example under consideration, two transistors 810 and 820 of the npn type, cascade connected, the emitter of the transistor 810 powering the base of the transistor 820 and the emitter of the latter being connected, via a resistor 830, to the trigger of the electronic switch 5.

Figure 5:
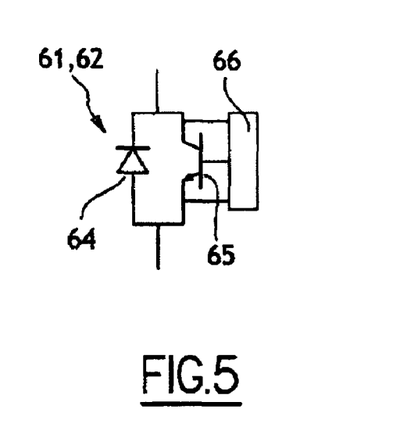

The control signal 601 intended for the or each rectifier cell is sampled by a line Cde_out on the emitter of the transistor 820, this line Cde_out leaving the rectifier cell represented in FIG. 5 to be connected to the line Cde_in of at least one other rectifier cell connected to the same DC bus polarity.

The 0V is taken at the anode of the diode 4 via a line Ref_out connected to the line Ref_in of this or these rectifier cells.

In the example under consideration, the electronic switch 5 is closed when a positive voltage is present at the output 860 of an operational amplifier 870 positioned at the input of the power stage 800 and operating as a comparator.

A pnp type transistor 880, the collector of which is connected to the −5V makes it possible to block the electronic switch 5 when the voltage at the output 860 of the operational amplifier 870 is negative.

The operational amplifier 870 has its non-inverting input connected to the output of an inhibitor stage 900.

The latter has an input 910 which receives the voltage at the cathode of the diode 4.

The inhibitor stage comprises an operational amplifier 930 working as a comparator, the output 920 of which is connected to the non-inverting input of the operational operator 870 and to a voltage divider comprising a resistor 940 connected to the 0V, a variable resistor 950 in series with a resistor 960 and a diode 970, the anode of which is connected to the emitter of the transistor 820.

The inverting input of the operational amplifier 870 is connected on the one hand to the +15V via a resistor 990 and to the 0V via a capacitor 1000 and on the other hand to the cathode of the diode 4 via a resistor 1010 and a diode 1020, the cathode of which is to the diode 4.

The resistor 1010 is of very low value, such that the inverting input of the operational amplifier 870 is adjusted to a negative potential when the diode 4 is fired.

The anode of the diode 680 is connected to the output 920 of the operational amplifier 930. Thus, in the presence of a control signal 601, the non-inverting input of the operational amplifier 870 is adjusted to a negative potential, and the output 860 switches to a low level, which renders the transistor 880 passing and closes the electronic switch 5.

The inhibitor stage 900 comprises a second operational amplifier 1050, the inverting input of which is connected on the one hand to the input 910 of the inhibitor stage 900 via several resistors 1060 connected in series, and on the other hand to the output 1070 of the operational amplifier 1050 via two resistors 1080 and 1090.

These two resistors are connected at their junction, via a capacitor 1100, to the −5V, and via a resistor 1110 to the non-inverting input of the operational amplifier 930. The non-inverting input of the operational amplifier 1050 is connected via a resistor 1130 to the +15V and via a diode 1140 and a resistor 1150 connected in series with the diode 1140 to the −5V.

The diode 1140 and the resistor 1150 are connected at their junction via a resistor 1160 to the inverting input of the operational amplifier 930 and to one of the terminals of a capacitor 1170, the other terminal of which is connected to the +15V.

The values of the various components of the inhibitor stage 900 associated with the operational amplifier 1050 are chosen such that in the event of firing of the diode 4 for a very brief duration because of the opening of the electronic switch of the other rectifier cell of the same arm, this firing will not provoke the closure of the electronic switch 5.

The inhibitor stage 900 behaves somewhat like a filter with saturation of the signal differential.

The control of the closure of the electronic switch 5 takes place at the frequency of the network when the voltage of the terminals of the diode 4 changes sign, and with no significant delay.

When, in operation, the diode 4 is fired, a negative voltage appears at the input 910 of the inhibitor stage 900 which provokes, provided that the firing does not take place when there is a preexisting relatively high voltage at the terminals of the diode 4, as explained above, the presence of +15V at the output 920 of the operational amplifier 930 and at the output 860 of the operational amplifier 870, which results in the closure of the electronic switch 5.

In the absence of the control signal 610 received from another rectifier cell, the phototransistor 630b of the optocoupler 630 is blocked.

When the signal 610 is received, the anode of the diode 680 is adjusted to a negative potential, which causes the output 860 of the operational amplifier 870 to be switched over to the −5V voltage and renders the transistor 880 passing, which provokes the opening of the electronic switch 5.

In the event of an overcurrent in the electronic switch 5, the inverting input of the operational amplifier 870 switches to a potential greater than that of the non-inverting input, which provokes the tripping of the electronic switch 5.

Figure 11:
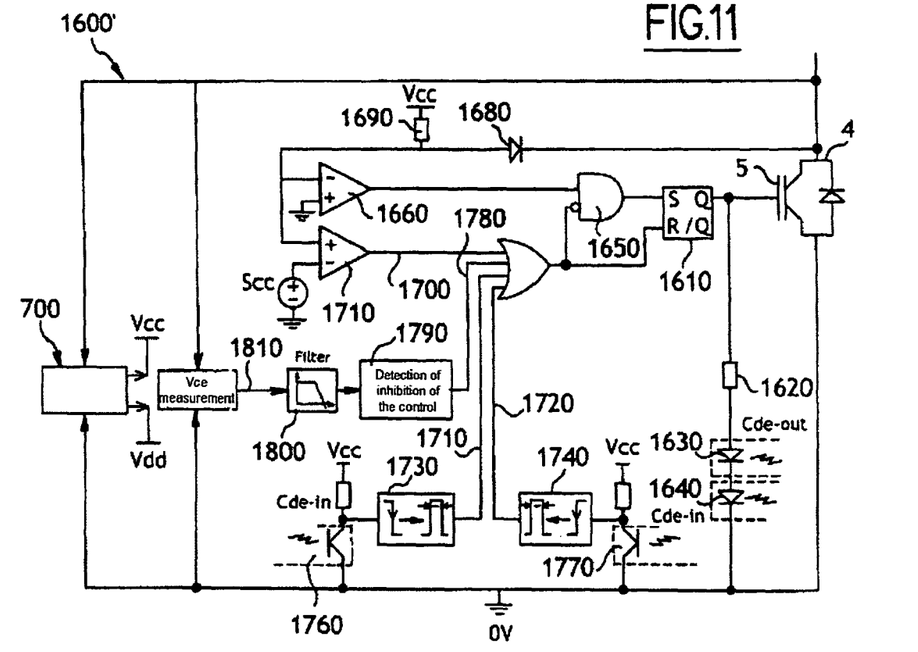

There now follows a description with reference to FIG. 11 of a variant of embodiment of the control means, referenced 1600'.

These control means 1600' comprise an RS type flip-flop 1610, the output Q of which is linked on the one hand to the trigger of the electronic switch 5 and on the other hand via a resistor 1620 to the line Cde_out controlling the opening of the electronic switches of the other cells, this line Cde_out being, in the example under consideration, connected to the diodes 1630 and 1640 of the optocouplers of these other cells.

The input S (set) of the flip-flop 1610 is connected to an AND gate 1650, of which one input is connected to the output of an operational amplifier 1660 and the other input, inverted, to the output of an OR gate 1670 and to the input R (reset) of the flip-flop 1610. The inverting input of the operational amplifier 1660 is connected to the anode of a diode 1680, the cathode of which is connected to the cathode of the diode 4 and the inverting input of the operational amplifier 1660 is also connected to a resistor 1690 connected to the Vcc delivered by the standalone power supply 700. The non-inverting input of this same operational amplifier 1660 is connected to the 0V, that is, to the anode of the diode 4.

The assembly consisting of the diode 1680 and the resistor 1690 makes it possible to recover the voltage at the terminals of the diode 4 with great sensitivity over the range +15V, −5V.

The OR gate 1670 has an input 1700 connected to the output of an operational amplifier 1710, of which the non-inverting input is connected to the anode of the diode 1680 and the inverting input to a voltage source Scc, the value of which is chosen according to the maximum intensity from which the electronic switch 5 is to be blocked in order to ensure its protection.

The OR gate 1670 has two inputs 1710 and 1720 connected to means 1730 and 1740 of detecting falling edges of the signal Cde_out originating from the other cells, via optocouplers 1760 and 1770.

The OR gate 1670 has a fourth input 1780 connected to a device for detecting inhibition of the control 1790 which comprises, for example, a filter 1800 with saturation of the differential to filter the voltage 1810 measured at the terminals of the electronic switch 5. The control inhibition detection means 1790 switch to the high state when the control to close the electronic switch needs to be inhibited, outside the normal operating ranges of the electronic switch 5 of the cell.

In the device of FIG. 11, the electronic switch 5 is thus closed when the voltage at the terminals of the diode 4 becomes negative and the output of the OR gate 1670 is in the low state.

The electronic switch 5 is passing as long as the output of the OR gate remains in the low state and is blocked when the output of the OR gate 1670 switches to the high state, that is, when either the output of the operational amplifier 1710 switches to the high state following an excessive intensity passing through the electronic switch 5, or when the open signal is received from one of the other cells via the line Cde_in.

Throughout the angular range during which the control needs to be inhibited, the high signal at the input 1780 of the gate 1670 holds the output Q of the flip-flop 1610 in the low state, which blocks the electronic switch 5.

Figure 12:
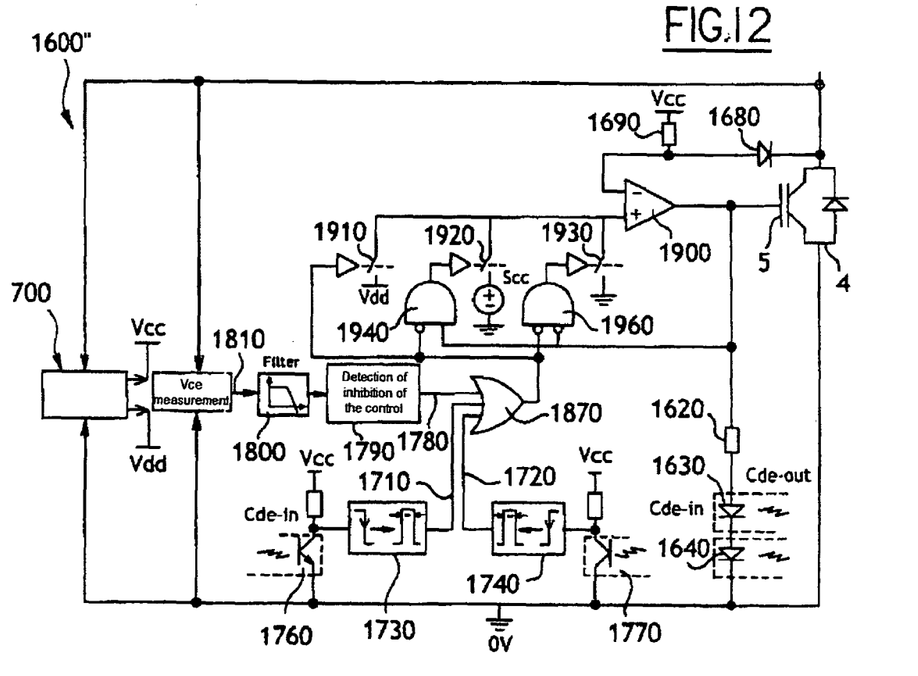

The control means 1600" of the exemplary embodiment of FIG. 12 differ from those of the example of FIG. 6 by the fact that the gate 1670 is replaced by an OR gate 1870 having no more than three inputs, namely the inputs 1710, 1720 and 1780 of the example of FIG. 6, and by the fact that the flip-flop 1610, the gate 1650, and the operational amplifiers 1660 and 1710 are replaced by an operational amplifier 1900, the inverting input of which is connected to the cathode of the diode 4 and the non-inverting input of which is connected to three electronic switches 1910, 1920 and 1930 that can, respectively, adjust the potential of the non-inverting input to Vdd, Scc and 0V.

The electronic switch 1910 is closed when the output of the OR gate 1870 is in the high state, inhibiting the control and blocking the electronic switch 5.

The electronic switch 1920 is controlled by an AND gate 1940, one input of which is connected to the output of the operational amplifier 1900 and an inverting input of which is connected to the output of the OR gate 1870.

The electronic switch 1930 is controlled by an AND gate 1960, of which the two inverted inputs are respectively connected to the output of the OR gate 1870 and to the output of the operational amplifier 1900.

Since the output of the OR gate 1870 is in the low state, and the electronic switch 5 is blocked, the electronic switch 1930 is closed and the potential of the non-inverting input of the operational amplifier 1900 is adjusted to 0V.

When the diode 4 is fired, the inverting input is adjusted to a negative potential and the output of the operational amplifier 1900 switches to the high state, which provokes the opening of the electronic switch 1930 and the closure of the electronic switch 1920. The electronic switch 1910 remains open.

The closure of the electronic switch 1920 makes it possible to adjust the potential of the non-inverting input of the operational amplifier 1900 to the voltage Scc, such that, in the event of an overshoot of a predefined intensity via the electronic switch 5, the output of the operational amplifier 1900 changes state and the switch 5 is blocked.

In the case of presence of the high signal on one of the inputs 1710, 1720 and 1780, the electronic switch 1910 is closed whereas the electronic switches 1920 and 1930 are kept in the open state. The potential of the non-inverting input of the operational amplifier 1900 is adjusted to the voltage Vdd, which keeps the electronic switch 5 blocked.

Naturally, the reversible rectifier is not limited to the examples that have just been described.

Figure 13:
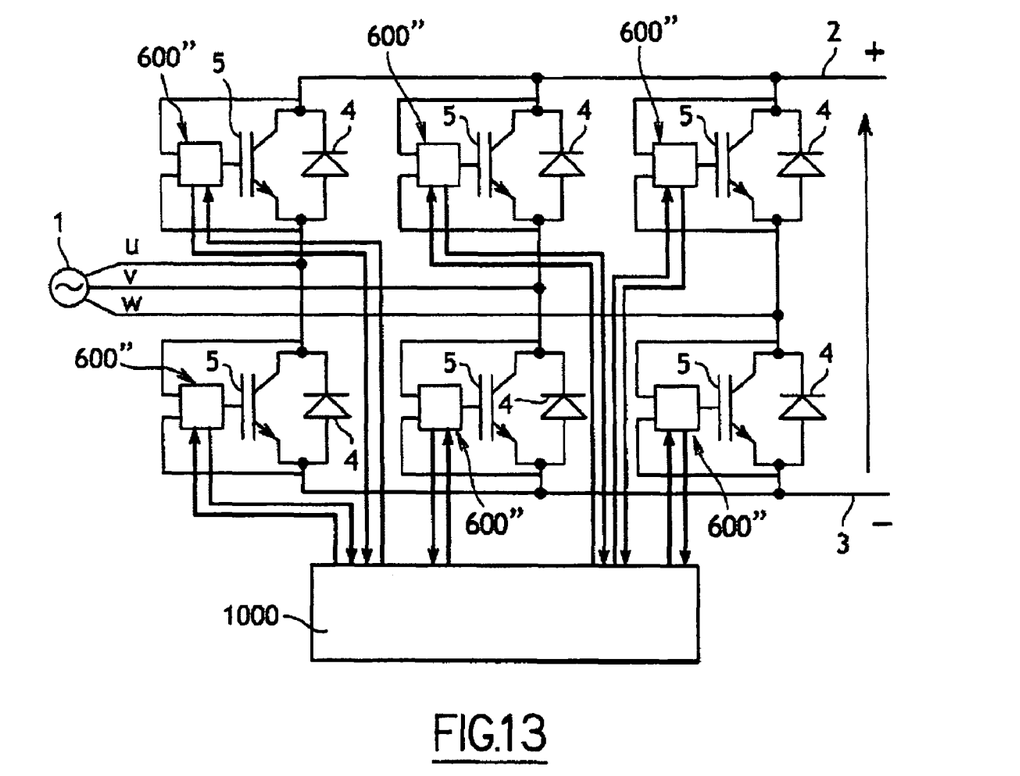
FIG. 13 is a view similar to FIGS. 7 and 8 of another exemplary embodiment of the invention, FIG. 14 diagrammatically represents the angular range for inhibiting the control of the electronic switch of a cell, and FIG. 15 diagrammatically represents a system for controlling an electrical generator.

In particular, as illustrated in FIG. 13, all the cells can include control means 600" which are not standalone but connected to a control device 1000 which is common to several cells, in this case all the cells in the example under consideration, and which manages the opening and closure cycles of the electronic switches 5, based on a detection of the conduction of the rectifier devices 4.

In such an exemplary implementation of the invention, the control means 600" of each rectifier cell can then be limited to driving the associated electronic switch 5.

The inhibitor stage 900 could also produce differently, for example with a differentiator followed by a comparator and an integrator, or with a detection of the angular phase so as to inhibit the control within a certain angular phase range during which the electronic switch of the other cell of the same arm is opened.

Figure 14:
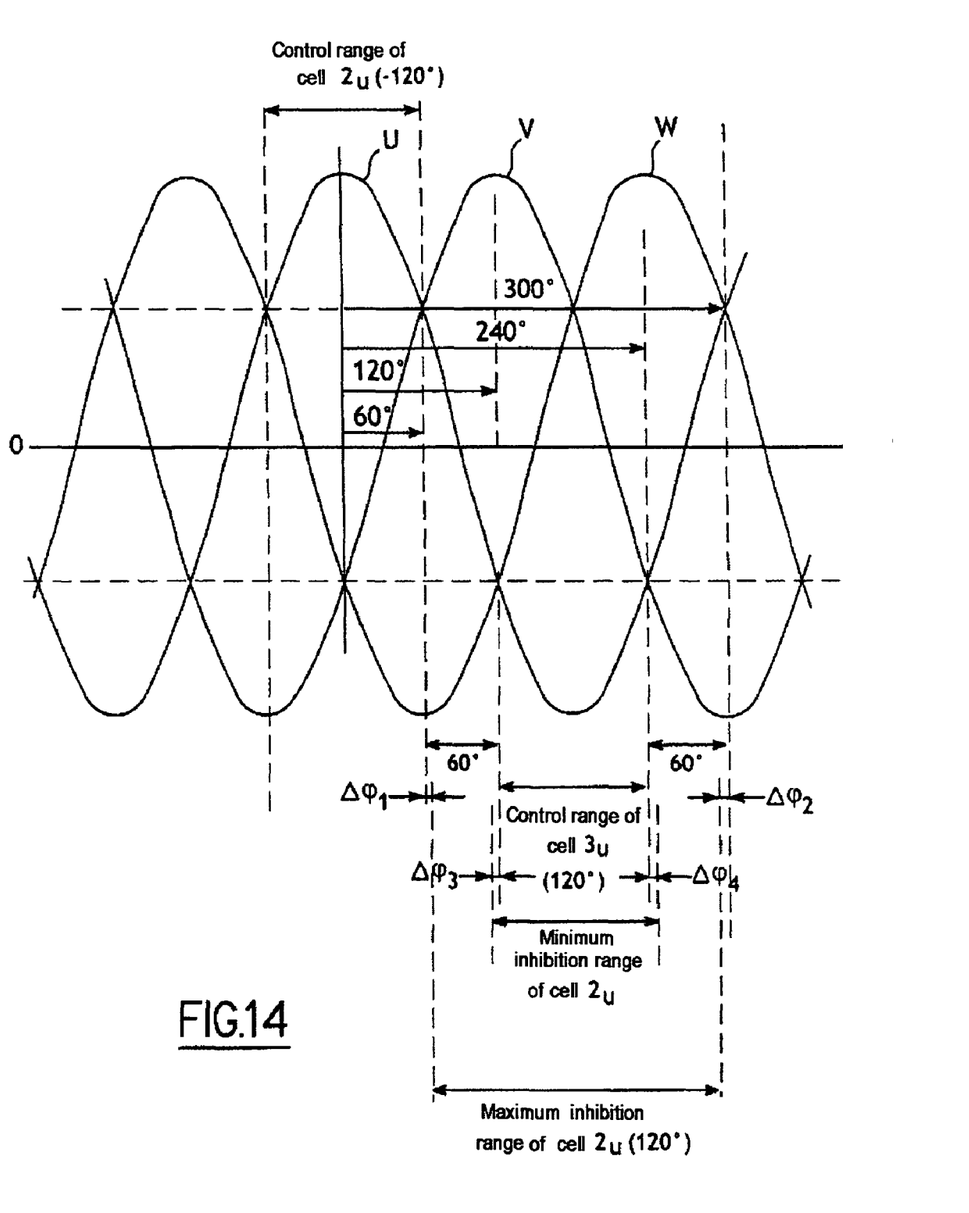

As an illustration, FIG. 14 shows the minimum and maximum inhibition angular ranges of the control of the electronic switch of the cell $2_u$.

The drawing shows $\Delta\phi_1$ and $\Delta\phi_2$ non-zero, $\Delta\phi_1 > 0$ and $\Delta\phi_2 > 0$, because the inhibition must not interfere with the control. $\Delta\phi_3$ and $\Delta\phi_4$ are safety intervals.

The control means are arranged to inhibit, for a given rectifier cell, the closure of the electronic switch in a predefined angular range, between $60° + \Delta\phi_1$ and $300° - \Delta\phi_2$ and mandatorily including the range $120° - \Delta\phi_3$ and $240° + \Delta\phi_4$, with $\Delta\phi_3 > 0$ and $\Delta\phi_4 > t_e$, where $t_e$ is the encroachment time, the angular reference being taken at the summit of the arch during which the rectifier device of the rectifier cell concerned is passing.

The electronic switches 5 are not limited to IGBTs and other components can be used, such as MOS or bipolar transistors, or other power components, whether current or future.

The links between the various cells need not be via optocouplers, and can be, for example, via transformers, or yet other means.

A reversible rectifier produced in accordance with the invention has numerous applications, and can in particular be used in the control system described previously with reference to FIG. 2. An advantage of such a system used with a variable speed drive is to reduce the capacitance of the DC bus compared to certain known systems. The system then becomes less cumbersome, more reliable and less expensive.

In some applications, the invention can make it possible to reduce, or even eliminate, the line inductances.

The rectifier can make it possible to recover energy from any reversible system or generator, for example from solar panels.

Figure 15:
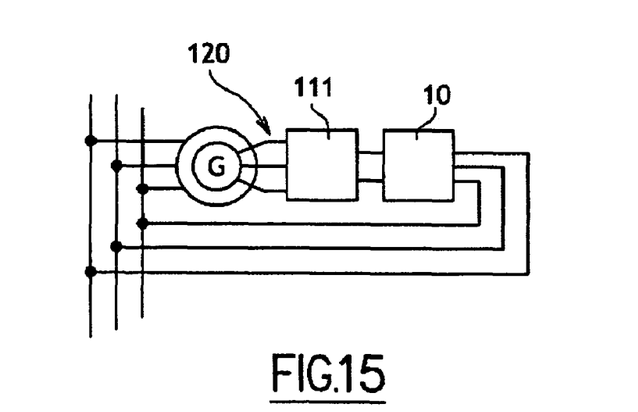

FIG. 15 shows a control system 120 for a generator, for example a wind generator, based on the so-called double feed principle, in which the rotor is powered at a variable frequency via a converter 121.

The expression "comprising (or including) one" should be understood to be synonymous with "comprising (or including) at least one", unless otherwise specified.

The invention claimed is:

1. A system for controlling the speed of an electric motor, comprising:
   a converter to be connected to a polyphase electricity network and to a DC bus,
   a filtering stage for the DC bus comprising at least one capacitor,
   a power stage,
   a control unit of the power stage,
   the converter being reversible and arranged to return to the network at least a fraction of the energy likely to be restored by the electric motor in operation, wherein the converter comprises self-switched switching cells.

2. The system as claimed in claim 1, wherein the filtering stage has an insufficient capacitance to stabilize the operation of the motor.

3. The control system as claimed in claim 1, wherein the control system has no chopper and no braking resistor.

4. The control system as claimed in claim 1, wherein the control unit of the power stage and the power stage are configured to power an asynchronous or synchronous motor.

5. The control system as claimed in claim 1, wherein the control unit for the power stage and the power stage are arranged to power a three-phase motor.

6. The control system as claimed in claim 1, wherein the power stage is configured to drive a motor with a power greater than or equal to 1 kW.

7. The control system as claimed in claim 1, wherein the capacitance of the at least one capacitor of the filtering stage is less than or equal to 5 µF per kW of power supplied.

8. The control system as claimed in claim 1, wherein the motor is powered by a current having a frequency greater than 300 Hz.

9. A reversible current rectifier, to be connected to a polyphase network and to a DC bus comprising:
a plurality of rectifier cells, each rectifier cell comprising a rectifier device and a one-way electronic switch connected in anti-parallel with the rectifier device, the rectifier devices of the various cells being configured so as to form one rectifier,
each rectifier cell comprising control means for controlling the electronic switch of the cell configured to close the latter after detecting a conduction of the rectifier device of the cell, so as to enable current to be returned to the network,
the control means receiving from another rectifier cell a signal external to the cell and controlling the opening of the electronic switch.

10. The rectifier of claim 9, wherein the rectifier is a full-wave rectifier.

11. The rectifier of claim 9, wherein the control means of each rectifier cell is configured to generate via an output, on closure of the electronic switch of that cell, at least one signal controlling the opening of the electronic switch of another rectifier cell associated with the same DC bus polarity, the control means of the another rectifier cell comprising an input that is connected to the output.

12. The rectifier of claim 9, wherein the rectifier devices are diodes.

13. The rectifier of claim 9, wherein the electronic switches are IGBTs.

14. The rectifier of claim 9, wherein each rectifier cell receives signals controlling the opening of the electronic switch from other cells associated with the same DC bus polarity.

15. The rectifier of claim 9, the polyphase network being three-phase.

16. The rectifier as claimed in claim 9, wherein each rectifier cell comprises an independent electric power supply.

17. The rectifier of claim 16, wherein the power supply is arranged to deliver a first voltage that is negative relative to the reference used to control the electronic switches and a second voltage that is positive relative to this reference.

18. The rectifier of claim 9, wherein the control means are analog.

19. The rectifier of claim 9, wherein the control means are arranged to provoke the opening of an electronic switch in the event of an overcurrent in the latter.

20. The rectifier of claim 9, wherein the rectifier cells are substantially identical.

21. The rectifier of claim 9, wherein the control means are arranged to inhibit the closure of the electronic switch following an abrupt variation of the voltage at the terminals of the rectifier device, generated on the opening of the electronic switch of the cell connected to the same phase of the network and to the opposite DC bus polarity.

22. The rectifier of claim 21, wherein the control means are arranged to inhibit, for a given rectifier cell, the closure of the electronic switch in a predefined angular range, on the one hand between $60°+\Delta\phi_1$ and $300°-\Delta\phi_2$ and including on the other hand the range $120°-\Delta\phi_3$ and $240°+\Delta\phi_4$, with $\Delta\phi_1>0$, $\Delta\phi_2>0$, $\Delta\phi_3>0$ and $\Delta\phi_4>t_e$, where $t_e$ is the encroachment time, the angular reference being taken at the summit of the arch during which the rectifier device of the rectifier cell concerned is passing.

23. The rectifier of claim 20, wherein the control means include a filtering stage with saturation of the signal differential.

24. A rectifier cell comprising:
a rectifier device,
a one-way electronic switch connected in anti-parallel with the rectifier device,
control means comprising at least one signal input and at least one signal output and configured to:
control the closure of the electronic switch when the rectifier device becomes passing,
when the electronic switch is closed, deliver via the at least one signal output to at least one first other cell, a signal controlling the opening of an electronic switch of that at least one first other cell, and
receive via the at least one signal input from at least one other second cell a signal controlling the opening of the electronic switch and open that electronic switch on receipt of this signal.

25. The cell as claimed in claim 24, comprising an independent electric power supply.

26. The cell as claimed in claim 24, comprising a filtering stage with saturation of the signal differential.

27. The cell as claimed in claim 24, taking the form of a single component or module, the latter comprising an input to be connected to a phase of the network, an output to be connected to a polarity of the DC bus, the at least one signal input to receive the open control signal from the at least one second other cell and the at least one signal output to send an open control signal to the at least one first other cell.

28. A system for controlling the speed of an electric motor comprising a reversible rectifier as claimed in claim 9.

29. A system for controlling a generator comprising a reversible rectifier as defined in claim 9.

30. The system as claimed in claim 29, wherein the generator is a wind generator.

31. An energy recovery system comprising a reversible rectifier as defined in claim 9 and a quasi current source.

32. The system as claimed in claim 31, wherein the quasi current source comprises solar panels.

33. A system for controlling the speed of an electric motor, comprising:
a reversible rectifier to be connected to a polyphase electricity network and connected to a DC bus, this rectifier comprising a plurality of rectifier cells, each rectifier cell comprising a rectifier device and a one-way electronic switch, connected in anti-parallel with the rectifier device, the rectifier devices of the various cells being configured so as to form a rectifier, each rectifier cell comprising control means for controlling the electronic switch of the cell configured to close the latter after detecting a conduction of the rectifier device of the cell so as to enable current to be returned to the network, the control means comprising a signal input and being configured to receive from another rectifier cell to which the control means are connected via the signal input, a signal external to the cell, said cell controlling the opening of the electronic switch, a power stage connected to the DC bus and to be connected to the electric motor.

34. The system of claim 33, comprising a filtering stage for the DC bus comprising at least one capacitor, the capacitance of the at least one capacitor of the filtering stage being less than or equal to 5 μF per kW of power supplied.

35. The system of claim 33, wherein the control means are arranged to inhibit a closure of the electronic switch following an abrupt variation of the voltage at the terminals of the rectifier device, generated on the opening of the electronic switch of the cell connected to the same phase of the network and to the opposite DC bus polarity.

36. The system of claim 33, wherein the control means are arranged to inhibit, for a given rectifier cell, the closure of the electronic switch in a predefined angular range, on the one hand between $60°+\Delta\phi_1$ and $300°-\Delta\phi_2$ and including on the other hand the range $120°-\Delta\phi_3$ and $240°+\Delta\phi_4$, with $\Delta\phi_1>0$, $\Delta\phi_2>0$, $\Delta\phi_3>0$ and $\Delta\phi_4>t_e$, where $t_e$ is the encroachment time, the angular reference being taken at the summit of the arch during which the rectifier device of the rectifier cell concerned is passing.

* * * * *